Patented Sept. 23, 1947

2,427,757

UNITED STATES PATENT OFFICE 2,427,757

CHEMICAL CONTACT MASS, PRODUCTION THEREOF, AND PROCESS OF PRODUCING OXYGEN THEREWITH

Fred R. Whaley and Eugene Oskar Brimm, Kenmore, N. Y., assignors to The Linde Air Products Company, a corporation of Ohio No Drawing. Application July 3, 1942, Serial No. 449,685

6 Claims. (Cl. 23—221)

This invention relates to a novel chemical process for extracting oxygen from a mixture of oxygen with inert gas, particularly for separating and collecting gaseous oxygen of high purity from the atmosphere. More particularly, the chemical process of producing oxygen is an improvement on the basic process of du Motay and Marechal disclosed in United States Patent 70,705, of November 12, 1867, and the process of George Kaszner disclosed in United States Patent 1,015,566, of January 23, 1912. The invention also relates to a novel improved contact mass for the chemical production of oxygen. Additionally, the invention relates to a novel process for producing the novel contact mass.

The oxygen producing process of du Motay et al. is performed by alternately passing air and steam through a closed retort over a hot alkali manganate reaction mass having the ability to be oxidized by the passage of air thereover, and thereafter to be deoxidized and release gaseous oxygen during the passage of steam thereover. The reversible reaction theoretically is:

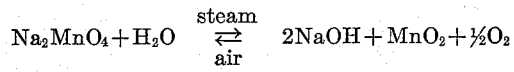

During the air phase of the du Motay et al. cycle, the oxygen is obsorbed from the air by the hot contact mass and the residual nitrogen passes off and may be collected if desired. During the steam phase of the cycle, gaseous oxygen is released from the contact mass and is collected, while the residual steam discharged with the oxygen is condensed and separated from the oxygen.

In the Kaszner process, an alkali meta-plumbate, such as sodium meta-plumbate, is added to the alkali manganate contact mass for increased stability of the mass during the cycling of air and steam.

The investigators of the prior art prepared their contact masses by sintering together at a high temperature in air the components, such as sodium hydroxide and manganese dioxide, with or without sodium meta-plumbate. The sintered mass then was broken up and charged into a retort wherein it was heated while air and steam at a high temperature alternately were passed thereover on a continually repeated cycle.

The principal object of the present invention is to provide a novel chemical process for producing oxygen from the atmosphere whereby improved yields of oxygen may be obtained. Another object is the provision of a novel contact mass for use in the process for producing oxygen.

Still another object is the provision of a novel method for preparing the novel contact mass of the invention.

Generally, the process for producing oxygen according to the invention comprises alternately passing air and steam through a retort over a hot contact mass prepared by a novel process for preparing contact masses. The latter process comprises sintering an intimate mixture of a substance selected from the group consisting of the oxides and hydroxides of the alkali metals with an oxide of manganese while introducing to the mixture an atmosphere of inert gas substantially free of oxygen to produce a mechanically strong mixture, and subsequently passing air, which contains oxygen, into contact with the sintered mixture at a temperature insufficient to cause a substantial amount of fusing or sintering to form a highly reactive mixture. Sintering preferably is done between about 1300° F. and 2250° F., the temperature depending largely on the constituents of the mass and the characteristics desired. During the passage of steam over the mass prepared in this way, oxygen is released together with residual steam. The steam is later condensed out and the non-condensable oxygen collected for immediate or future use. Of course, the nitrogen discharged from the retort on the air phase may also be collected if desired.

The step of passing air into contact with the sintered mixture at a temperature below the temperature at which sintering occurs to a substantial extent may be performed as a separate step, or it may be performed as an integral part of the cycling process for producing oxygen. In the latter case, the subsequent treatment of the sintered mixture by air at a temperature lower than the sintering temperature of the mixture is brought about by the passage of air over the mass during the air phase of the oxygen production cycle. In whatever manner this step is performed, it is preferred to hold the mass at a temperature between room temperature and the temperature at which the oxygen producing cycle is to be operated, and preferably above about 400° F.

For the best operation of the process for producing oxygen, it is preferred that the mixture of manganese oxide and the oxide or hydroxide of the alkali metal be sintered in an atmosphere as free from oxygen as possible, as mentioned above. However, because the manganese oxide itself tends to give off small amounts of oxygen during the sintering process, it is almost impossible to obtain an atmosphere completely free from oxygen. Moreover, fair results are obtained when the mixture is sintered in an oxygen-containing atmosphere having an oxygen content less by any amount than the oxygen content of air, even though the most beneficial results are obtained by substantially completely excluding oxygen.

The process for producing oxygen is described generally above as performed with a simple manganate contact mass, prepared according to the process of the invention. However, the process for producing oxygen also may be performed using alkali manganate contact masses to which have been added other substances, such as aluminum oxide, sodium meta-plumbate, silicon dioxide, molybdenum dioxide, boron oxide, and the like. Also, ore containing impurities may be used as the source of the oxide of manganese. The primary requirement is to sinter the mass in a substantially oxygen-free atmosphere, and thereafter pass air over the mass at a temperature low enough to avoid a substantial amount of sintering or fusing.

The novel process for producing the novel contact mass of the invention has been described in a general way in the foregoing description of the process for producing oxygen. Specific examples, however, may create a better understanding of the novel process for producing the contact mass, and of the improved process for producing oxygen with the novel contact mass.

Example 1

Several samples of contact masses were prepared by sintering together in a furnace intimate mixtures having the proportions of 2 mols of manganese dioxide to 1 mol of lead dioxide to 6 mols of sodium hydroxide, some of the samples being sintered in an atmosphere of oxygen, and others in air or nitrogen at a temperature of about 1720° F. The manganese dioxide contained 85% $MnO_2$, the balance being mostly lower oxides of manganese. Some of the samples were rabbled during sintering and others were not. The sintered masses then were broken up and charged in the pulverulent condition into retorts, where they were held at a temperature of about 1200° F. and air and steam alternately were passed thereover. The oxidation of the sintered mixtures prepared in an atmosphere of the inert gas nitrogen was completed during the air phase of the cycling process, which was conducted at a temperature well below the temperature at which any substantial amount of sintering occurs in the mass. For equal weights of mass, the following oxygen yields were obtained, expressed in cubic centimeters per 10 minute cycle (consisting of 5 minute air and steam phases):

| Cycling Temperature | Mass Rabbled | Contact Mass Prepared in— | | |
|---|---|---|---|---|
| | | Oxygen | Air | Nitrogen |
| 1200° F | No | 50 | | 80 |
| 1200° F | Yes | | 104 | 135 |

Example 2

Several samples of contact masses were prepared by intimately mixing together the constituents in the proportion of 4 mols of manganese dioxide ($MnO_2$) to 1 mol of aluminum oxide to 11 mols of sodium hydroxide and sintering the mixtures in a furnace at about 1470° F. without rabbling. The manganese dioxide contained 91% $MnO_2$, the balance being mostly lower oxides of manganese. An atmosphere of oxygen was maintained over some mixtures during sintering, and atmospheres of air or nitrogen over others. The sintered mixtures then were broken up and charged in the pulverulent condition into retorts, where they were held at about 1200° F. in some instances, and at about 1290° F. in other instances, during the cycling of air and steam alternately thereover. The oxidation of each mass prepared in an atmosphere of the inert gas nitrogen was completed during the air phase of the cycling process. The following yields of oxygen were obtained, expressed in cubic centimeters per 10 minute cycle (consisting of 5 minute air and steam phases):

| Cycling Temperature | Contact Mass Prepared in— | | |
|---|---|---|---|
| | Oxygen | Air | Nitrogen |
| 1200° F | 142 | 156 | 164 |
| 1290° F | 177 | 199 | 214 |

Example 3

Manganese dioxide was reduced to an oxygen content corresponding to $Mn_3O_4$ by heating, and was then mixed with potassium hydroxide in the proportions of 6 mols of $Mn_3O_4$ to 8 mols of KOH, the mixture being sintered in a nitrogen atmosphere at 2200° F. The resulting contact mass was then tested by passing steam and air thereover at atmospheric pressure, and an oxygen yield of 61 cubic centimeters per 10 minute cycle was obtained for a weight of mass equal to the weights of the masses mentioned in Examples 1 and 2.

Another sample of the same contact mass was tested under air and steam pressures of 75 lbs./sq. in. and gave an oxygen yield of 0.33 cu. ft./hr. for a unit weight of mass. This sample was operated for ten days and showed excellent stability.

From the above examples it may be seen that considerably improved oxygen yields are obtained when using a manganate contact mass prepared in an atmosphere having an oxygen content lower than the oxygen content of air, and preferably in a substantially oxygen-free atmosphere of inert gas, the sintered mass subsequently being treated with air at a temperature low enough to prevent a substantial amount of sintering of the mass. Moreover, rabbling the mixture during sintering gives a mass which provides improved yields of oxygen when cycled with air and steam.

There is further evidence that the maintenance of an oxygen-free atmosphere during the preparation of a contact mass results in a higher oxygen yield during subsequent use of the mass. A relatively large sample of a mixture, proportioned as in Example No. 2 above, was sintered in a deep crucible in an oxygen atmosphere, without rabbling, in such a way that oxygen was freely accessible to the top of the mass but was practically excluded from the bottom of the mass. Samples of the sintered contact mass were taken from the top, center, and bottom of the crucible and were cycled with steam and air alternately at about atmospheric pressure. Yields of oxygen of 154, 170, and 180 cubic centimeters per 10 minute cycle were obtained, respectively, thus showing that the oxygen yield increases with decreasing amounts of oxygen in contact with the mixture when it is sintered.

The true reason for the improved results obtained when contact masses are prepared by the process of the invention has not been determined. However, in theory, if a contact mass mixture is sintered in an atmosphere low in oxygen or substantially free of oxygen, the complete oxidation of the material to the higher valence states cannot occur at the high temperature of sintering. The final oxidation of the mass then occurs between room temperature and the temperature maintained in the steam-air cycling unit, at which lower temperatures practically no subsequent sintering or fusing can occur. As a result, it is believed that the bound oxygen in the mass is easily accessible to the steam during the steam phase of the process, when oxygen is liberated from the contact mass.

For a simple alkali manganate contact mass made by sintering together an alkali hydroxide such as sodium hydroxide, and an oxide of manganese, such as manganese dioxide, it is believed that the chemical reaction proceeds theoretically as follows when air is excluded during the sintering step:

$$2NaOH + 3MnO_2 \rightarrow Na_2MnO_4 + Mn_2O_3 + H_2O$$

Upon subsequently introducing air to the sintered mixture at a relatively low temperature, the $Mn_2O_3$ is believed to be oxidized and to combine with additional sodium hydroxide, forming $Na_2MnO_4$.

In a similar manner, when additions of other materials are made to the simple manganate mixture, for example, lead dioxide or aluminum oxide, the main reaction of sodium hydroxide with manganese dioxide is believed to proceed as above to produce $Na_2MnO_4$ and $Mn_2O_3$. Furthermore, the lead dioxide or the aluminum oxide are believed to react with additional sodium hydroxide to form sodium meta-plumbate or sodium meta-aluminate, respectively, as in the following equations:

$$2NaOH + PbO_2 \rightarrow Na_2PbO_3 + H_2O$$
$$2NaOH + Al_2O_3 \rightarrow 2NaAlO_2 + H_2O$$

As mentioned above, the real reasons for the improvement in the contact mass and the process for producing oxygen according to the invention are not definitely known. It is not intended, therefore, to limit the scope of the invention by any theories advanced herein. Furthermore, although masses prepared by sintering together an oxide of manganese and an alkali oxide or hydroxide are generally called "manganate" masses, such masses probably consist of a heterogeneous mixture of complex and simple manganates together with uncombined higher and lower oxides of manganese.

What is claimed is:

1. A process for preparing a manganate type contact mass comprising intimately mixing with an oxide of manganese at least one substance selected from the group consisting of the oxides and hydroxides of the alkali metals in amount sufficient to react with at least a substantial portion of said oxide of manganese, introducing an atmosphere of inert gas substantially free of oxygen to the mixture, sintering said mixture at a temperature between 1300° and 2250° F. in said atmosphere, and subsequently oxidizing the sintered mixture by passing oxygen into contact therewith at a temperature insufficient to cause a substantial amount of fusing and sintering, said temperature being above 400° F. and not exceeding 1290° F.

2. A process for extracting oxygen from a mixture of oxygen with inert gas comprising alternately passing said mixture and steam over a hot sintered manganate type contact mass comprising the product of intimately mixing with an oxide of manganese at least one substance selected from the group consisting of the oxides and hydroxides of the alkali metals in amount sufficient to react with at least a substantial portion of said oxide of manganese, introducing an atmosphere of inert gas substantially free of oxygen to the mixture, sintering said mixture at a temperature between 1300° and 2250° F. in said atmosphere, and subsequently oxidizing the sintered mixture by passing oxygen into contact therewith at a temperature insufficient to cause a substantial amount of fusing and sintering, said temperature being above 400° F. and not exceeding 1290° F.

3. A process for preparing a manganate type contact mass comprising intimately mixing together an oxide of manganese, an oxide of aluminum, and at least one substance selected from the group consisting of the oxides and hydroxides of the alkali metals in amount sufficient to react with at least a substantial portion of said oxides of manganese and aluminum, introducing an atmosphere of inert gas substantially free of oxygen to the mixture, sintering said mixture at a temperature between 1300° and 2250° F. in said atmosphere, and subsequently oxidizing the sintered mixture by passing oxygen into contact therewith at a temperature insufficient to cause a substantial amount of fusing and sintering, said temperature being above 400° F. and not exceeding 1290° F.

4. A process for extracting oxygen from a mixture of oxygen with inert gas comprising alternately passing said mixture and steam over a hot sintered manganate type contact mass comprising the product of intimately mixing together an oxide of manganese, an oxide of aluminum, and at least one substance selected from the group consisting of the oxides and hydroxides of the alkali metals in amount sufficient to react with at least a substantial portion of said oxides of manganese and aluminum, introducing an atmosphere of inert gas substantially free of oxygen to the mixture, sintering said mixture at a temperature between 1300° and 2250° F. in said atmosphere, and subsequently oxidizing the sintered mixture by passing oxygen into contact therewith at a temperature insufficient to cause a substantial amount of fusing and sintering, said temperature being above 400° F. and not exceeding 1290° F.

5. A process for preparing a manganate type contact mass comprising intimately mixing together an oxide of lead, an oxide of manganese, and at least one substance selected from the group consisting of the oxides and hydroxides of the alkali metals in amount sufficient to react with at least a substantial portion of said oxides of manganese and lead, introducing an atmosphere of inert gas substantially free of oxygen to the mixture, sintering said mixture at a temperature between 1300° and 2250° F. in said atmosphere, and subsequently oxidizing the sintered mixture by passing oxygen into contact therewith at a temperature insufficient to cause a substantial amount of fusing and sintering, said temperature being above 400° F. and not exceeding 1290° F.

6. A process for extracting oxygen from a mixture of oxygen with inert gas comprising alternately passing said mixture and steam over a hot sintered manganate type contact mass comprising the product of intimately mixing together an oxide of lead, an oxide of manganese, and at least one substance selected from the group consisting of the oxides and hydroxides of the alkali metals in amount sufficient to react with at least a substantial portion of said oxides of manganese and lead, introducing an atmosphere of inert gas substantially free of oxygen to said mixture, sintering said mixture at a temperature between 1300° and 2250° F. in said atmosphere, and subsequently oxidizing the sintered mixture by passing oxygen into contact therewith at a temperature insufficient to cause a substantial amount of fusing and sintering, said temperature being above 400° F. and not exceeding 1290° F.

FRED R. WHALEY.
EUGENE O. BRIMM.

REFERENCES CITED

The following references are of record in the file of this patent:

UNITED STATES PATENTS

| Number | Name | Date |
| --- | --- | --- |
| 70,705 | Du Motay | Nov. 12, 1867 |
| 500,697 | Webb | July 4, 1893 |
| 505,809 | Bowman | Oct. 3, 1893 |
| 515,443 | Parkinson | Feb. 27, 1894 |
| 519,627 | Fanta | May 8, 1894 |
| 588,614 | Stuart | Aug. 24, 1897 |
| 1,015,566 | Kraszner | Jan. 23, 1912 |
| 1,074,501 | Granjon | Sept. 30, 1913 |
| 1,303,911 | Jorgensen | May 20, 1919 |
| 1,421,271 | McNeil | June 27, 1922 |
| 1,855,676 | Holt et al. | Apr. 26, 1932 |
| 2,086,507 | Larson | July 6, 1937 |
| 2,245,495 | Pemble | June 10, 1941 |

FOREIGN PATENTS

| Number | Country | Date |
| --- | --- | --- |
| 14,925 | Great Britain | of 1890 |

OTHER REFERENCES

Mellor, Inorganic and Theoretical Chemistry, Longmans Green & Co., New York, 1932, vol. 12, page 283.

Phillips, "Mineralogy," MacMillan Co., New York, 1912, pp. 501 and 502.